3,317,566
SYNTHESIS OF Δ⁸,¹⁴-BISDEHYDROOESTRONE 3-ETHERS

John Stanley Whitehurst, Exeter, David John Crispin, Ashburton, and Clive Beresford Challis Boyce, Kent, England, assignors to Aspro-Nicholas Limited, London, England, a British company
No Drawing. Filed Nov. 1, 1963, Ser. No. 320,845
Claims priority, application Great Britain, Nov. 8, 1962, 42,182/62
20 Claims. (Cl. 260—345.9)

This invention is concerned with a new and improved synthesis of Δ⁸,¹⁴-bisdehydrooestrone 3-ethers and certain novel intermediates therefor.

According to the present invention, there is provided a process which comprises subjecting to cyclising conditions a 5,6,7,8-tetrahydro-1-keto-4[(2'-m-oxyphenyl)ethyl]-indan-5-one compound of the general formula:

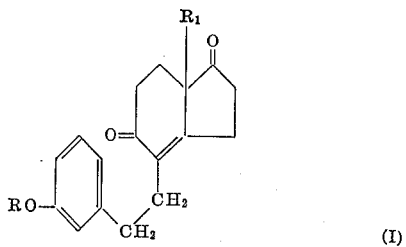

wherein R represents a hydrocarbon substituent such as an alkyl group, preferably a lower alkyl group and particularly methyl, or a lower aralkyl group, for example a phenylalkyl group such as benzyl, and R₁ represents hydrogen or a hydrocarbon substituent such as a lower alkyl group, for example methyl, ethyl, n-propyl or isopropyl, or a lower aralkyl group to produce a Δ⁸,¹⁴-bisdehydrooestrone compound of the general formula:

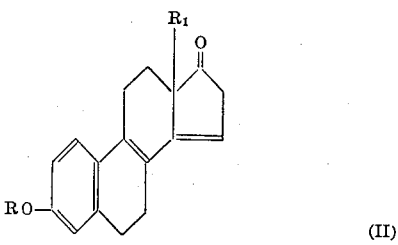

wherein R and R₁ have the same meanings as defined above.

Cyclisation is advantageously effected by the action of a suitable acidic reagent, for example a solution of phosphorus pentoxide in phosphoric acid, for example by heating to a temperature of from 50 to 90° C. for up to one hour under an inert atmosphere, for example of nitrogen, conveniently using approximately equal weights of phosphorus pentoxide and syrupy phosphoric acid. Alternatively, warming in the presence of dilute hydrochloric acid in methanol or ethanol may be employed.

Any Δ⁸,¹⁴⁽¹³⁾-isomer formed in the case in which R₁ is hydrogen may be converted to the desired Δ⁸,¹⁴⁽¹⁵⁾-compound by the action of a base.

The compounds of general Formula I are novel compounds and form a part of this invention. They may be made, in accordance with a preferred feature of the invention, by oxidation of the corresponding 1β-hydroxy compounds, which are also novel compounds forming a part of this invention, for example with chromic acid, conveniently by the solution of an aqueous solution thereof to a solution of the 1β-hydroxy compound in a water-miscible solvent.

In accordance with a preferred feature of the invention, the requisite 1β-hydroxy compound, namely a 5,6,7,8-tetrahydro - 1β - hydroxy - 4[(2'-m-oxyphenyl)ethyl]-indan-5-one, is obtained by m-oxyphenethylation of an alkali metal enolate of a 5,6,7,8-tetrahydro-1β-hydroxyindan-5-one of the general formula:

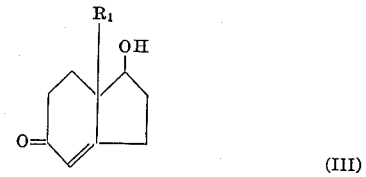

wherein R₁ has the meaning defined above, in which the 1β-hydroxy group is protected, such as by etherification, for example the 1β-tetrahydropyranyl ether, followed by removal of the protecting group by hydrolysis or otherwise. The required starting compounds (5,6,7,8-tetrahydro-1-β-hydroxyindan-5-ones) of Formula III may be obtained by the method described by C. B. C. Boyce and J. S. Whitehurst, J. Chem. Soc., 1960, 4547.

An alkali metal enolate, preferably the potassium enolate, of the protected 1β-hydroxy compound may be made by reacting it with an alkali metal or suitable alkali metal compound in a suitable solvent such as benzene or, preferably, t-butanol. Suitable alkali metal compounds which may be used in place of potassium metal to make the potassium enolate are potassium hydride, potassium amide and potassium triphenylmethyl. Enol formation is preferably effected in an inert atmosphere, for example of dry nitrogen, under reflux conditions.

The alkali metal enolate is m-oxyphenenthylated, for example m-methoxyphenethylated, by reaction, conveniently in the same reaction medium without isolation and advantageously under reflux conditions, with a suitable 2-m-oxyphenethylating agent such as a 2-m-oxyphenylethyl toluene-p-sulphonate (obtainable from the corresponding 2-m-oxyphenylethyl alcohol by reaction with toluene-p-sulphonyl chloride) or a 2-m-oxyphenylethyl methanesulfonate or, preferably, a 2-m-oxyphenylethyl p-nitrobenzenesulphonate (obtainable from the corresponding 2-m-oxyphenylethyl alcohol by reaction with p-nitrobenzenesulphonyl chloride). It will be understood that the group in the meta-position of the m-oxyphenylating agent is the group RO wherein R has the meaning defined above.

It is a particular feature of this aspect of the invention to carry out enolate formation and its aralykylation in t-butanol as use of this solvent raises the yield considerably with respect to that obtainable when using a solvent such as benzene, as may be seen by comparing Example 2 with Example 1.

The group protecting the 1β-hydroxy group, for example a tetrahydropyranyl ether group, is then removed, preferably without isolation of the protected compound, and this may be effected by hydrolysis by warming gently with a dilute aqueous alcoholic solution of a strong acid such as hydrochloric acid.

The resulting 1β-hydroxy compound is then normally recovered by diluting the reaction mixture with water, extracting with a suitable solvent such as ether, evaporation of the solvent, and purification of the residual gum, as by chromatography. The 1β-hydroxy compound is then oxidised to the 1-keto compound of Formula I as described above.

In the most typical case of the processes of the present invention both R and R₁ represent methyl groups, and it will be understood that these groups remain constant throughout the successive stages outlined above.

In a narrow aspect, therefore, the present invention provides a process for making a Δ⁸,¹⁴-bisdehydrooestrone compound which comprises cyclising with phosphorus pentoxide dissolved in phosphoric acid the compound obtainable by (a) treating 5,6,7,8-tetrahydro-1β-tetrahydropyranyloxy-8-methylindan-5-one first with potassium (or potassium hydride or potassium triphenylmethyl) in benzene and then (b) with 2-(m-methoxyphenyl)ethyl toluene-p-sulphonate, then (c) hydrolysing the product with aqueous hydrochloric acid and thereafter (d) oxidising the product with chromic acid.

$\Delta^{8,14}$-bisdehydrooestrone compounds of general Formula II made in accordance with the present invention are useful intermediates for the manufacture of various steroid hormones, particularly 19-norsteroids. Thus, for example, the compound in which both R and $R_1$ represent methyl groups may be converted to d,l-oestrone methyl ether as described in Chemistry and Industry (London), 1022 (1960).

The following examples illustrate the present invention:

EXAMPLE 1

1st stage

A mixture of 5,6,7,8-tetrahydro-1β-hydroxy-8-methylindan-5-one (III; $R_1$=CH$_3$) (4 g.), dihydropyran (15 ml., distilled from potash), ether (10 ml.) and concentrated hydrochloric acid (8 drops) was shaken mechanically for four hours at room temperature. More ether (ca. 50 ml.) was added and the solution was then washed with 10% potassium hydroxide solution, then water, and finally dried over MgSO$_4$. Evaporation of the ether left the crude 5,6,7,8-tetrahydro-1β-tetrahydropyranyloxy-8-methylindan-5-one (5.8 g.) which was sufficiently pure for the subsequent steps. The pure compound distilled at 130° C./0.05 mm., $n_D^{20}$ 1.5150, $\lambda_{max}$. 242 m$\mu$, $\epsilon$10,800; $\lambda_{max}$. (film) 1663, 1447, 1337, 1254, 1201, 1126, 1074, 1033, 1020, 968, 906, 872 cm.$^{-1}$.

2nd stage

The crude 1β-tetrahydropyranyl ether (3 g.) in benzene (8 ml.) was converted into its potassium enolate by adding it to a mechanically stirred suspension of potassium (0.52 g.), potassium amide (0.66 g.) or potassium triphenylmethyl (3.40 g.) in benzene under dry nitrogen and refluxing the mixture gently for two hours.

3rd stage

To the boiling solution of the potassium enolate 2-m-methoxyphenylethyl toluene-p-sulphonate (3.80 g.) in benzene (8 ml.) was added over one hour and, after a further 12 hours, all solvent was evaporated to leave a residue containing 5,6,7,8-tetrahydro-1β-tetrahydropyranyloxy - 4[2'-m-methoxyphenyl)ethyl]-8-methylindan-5-one.

4th stage

The residue was warmed gently with 2 N hydrochloric acid (15 ml.) and ethanol (50 ml.) to hydrolyse the 1β-ether group. Dilution with water, extraction with ether and evaporation of solvent left a gum which was chromatographed on neutral alumina (Grade I) to give colourless needles of 5,6,7,8 - tetrahydro - 1β - hydroxy-4[(2'-methoxyphenyl)ethyl] - 8 - methylindan-5-one (0.65 g., M.P. 88° C. from ether-petroleum spirit), $\lambda_{max}$. 249 m$\mu$, $\epsilon$6000; $\gamma_{max}$. (KBr disc) 3440, 1666, 1587, 1490, 1460, 1445, 1365, 1254, 1190, 1150, 1030, 885 cm.$^{-1}$.

5th stage

This compound (0.50 g.) dissolved in pure acetone (40 ml.) was treated dropwise with 8 N chromic acid until an orange-brown colour persisted. Ten minutes later saturated brine was added and the solution then extracted with ether. Drying over MgSO$_4$ and evaporation of the solvent left a viscous gum. It was purified by chromatography of its benzene solution on Florisil whereby 5,6,7,8 - tetrahydro - 1 - keto-4[(2'-methoxyphenyl) ethyl]-8-methylindan-5-one (I; R=CH$_3$, $R_1$=CH$_3$) was obtained as a colourless gum (0.42 g.), $\lambda_{max}$. 250 m$\mu$, $\epsilon$7000; $\gamma_{max}$. (liquid film) 2934, 1740, 1650, 1590, 1452, 1358, 1318, 1258, 1170, 1120, 1056, 872, 792 cm.$^{-1}$. The bis-2,4-dinitrophenylhydrazone crystallised from chloroform as red micro-needles, M.P. 258–259.5° C., $$\lambda_{max}^{CHCl_3} 380 \text{ m}\mu, \epsilon 46,000$$

6th stage

The compound I, where R=CH$_3$ and $R_1$=CH$_3$, (0.32 g.) was treated with a mixture of phosphorus pentoxide (2 g.) and syrupy phosphoric acid (1.6 ml.) at 75° C. under nitrogen for 20 minutes. After cooling and adding ice-water the organic material was extracted with ether-ethyl acetate (1:1). Evaporation, followed by chromatography of the product on Florisil, gave colourless needles of $\Delta^{8,14}$-bisdehydrooestrone 3-methyl ether (II; R=CH$_3$, $R_1$=CH$_3$) (0.14 g., M.P. 108.5° C., $\lambda_{max}$. 313 m$\mu$, $\epsilon$32,200; $\gamma_{max}$. (KBr disc) 2877, 1720, 1585, 1548, 1482, 1416, 1278, 1242, 1134, 1034, 976, 863, 821, 805 cm.$^{-1}$.

EXAMPLE 2

Example 1 is repeated, except that the second and third stages thereof are replaced by the following alternative procedures:

2nd stage

The crude 1β-tetrahydropyranyl ether (3 g.) in t-butanol (60 ml.) was added slowly to a boiling and mechanically stirred solution of potassium (0.47 g.) in t-butanol (60 ml.) under nitrogen during 15 minutes and the solution refluxed for a further 30 minutes.

3rd stage

To the boiling solution of the potassium enolate, 2-m-methoxyphenylethyl toluene-p-sulphonate (3.8 g.) in t-butanol (150 ml.) was added dropwise during 3 hours. After a further 30 minutes refluxing, the solution was cooled, treated with water (200 ml.) and the t-butanol distilled off. The aqueous residue was extracted with ether, which was then dried and evaporated. The remaining oil was partially distilled to remove a volatile fraction (B.P. 45–50° C./0.05 mm.) and the residue was hydrolysed as described in stage 4 of Example 1. The yield of 5,6,7,8 - tetrahydro - 1β - hydroxy-4[(2'-m-methoxyphenyl)ethyl]-8-methylindan-5-one was 0.82 g.

We claim:

1. A method of making a $\Delta^{8,14}$ - bisdehydrooestrone compound which comprises subjecting a dione compound of the formula

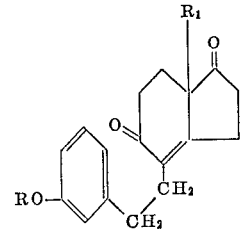

wherein R is selected from the class consisting of lower alkyl and lower aralkyl and $R_1$ is selected from the class consisting of hydrogen, lower alkyl and lower aralkyl, to acidic conditions effective to cyclise the same to a $\Delta^{8,14}$-bisdehydrooestrone compound.

2. A method according to claim 1, wherein the dione is cyclised by reaction with phosphorus pentoxide in phosphoric acid.

3. A method according to claim 1, wherein the dione is cyclised by reaction in alkanolic solution with hydrochloric acid in the presence of water.

4. A method of making $\Delta^{8,14}$-bisdehydrooestrone 3-methyl ether comprising subjecting 5,6,7,8-tetrahydro-1- keto - 4[(2' - m-methoxyphenyl)-ethyl]-8-methylindan-5-one to acidic conditions effective to cyclise the same to $\Delta^{8,14}$-bisdehydrooestrone 3-methyl ether.

5. A method of making a dione compound of the formula

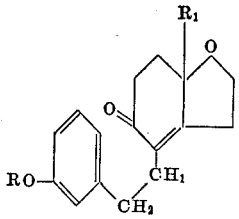

wherein R is selected from the class consisting of lower alkyl and lower aralkyl and $R_1$ is selected from the class consisting of hydrogen, lower alkyl and lower aralkyl, comprising oxidising a corresponding 1$\beta$-hydroxy compound by the action of chromic acid.

6. A method of making a 1$\beta$-hydroxy compound of the formula

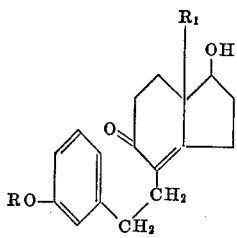

wherein R is selected from the class consisting of lower alkyl and lower aralkyl and $R_1$ is selected from the class consisting of hydrogen, lower alkyl and lower aralkyl, comprising reacting an alkali metal enolate of a compound of the formula:

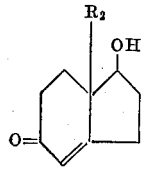

wherein $R_1$ is selected from the class consisting of hydrogen and lower alkyl, the hydroxy group of which is protected by etherification with a protective ether group, with a 2-m-oxyphenethylating agent in which the m-group has the formula RO wherein R is selected from the class consisting of lower alkyl and lower aralkyl, and then hydrolysing off the protecting ether group.

7. A method according to claim 6, wherein the enolate is reacted with a 2-m-oxyphenylethyl-p-nitrobenzenesulphonate.

8. A method according to claim 6, wherein the enolate is reacted with a 2-m-oxyphenylethyl toluene-p-sulphonate.

9. A method according to claim 6, wherein the enolate is reacted with a 2-m-oxyphenylethyl methanesulphonate.

10. A method according to claim 6, wherein the enolate is reacted in solution in t-butanol.

11. A method according to claim 6, wherein the hydroxy group is protected by etherification with a tetrahydropyranyl group.

12. 5,6,7,8 - tetrahydro - 1$\beta$-tetrahydropyranyloxy-4-[(2'-m-methoxyphenyl)ethyl]-8-methylindan-5-one.

13. 5,6,7,8 - tetrahydro - 1$\beta$ - tetrahydropyranyloxy-8-methylindan-5-one.

14. A method of making $\Delta^{8,14}$-bisdehydrooestrone 3-methyl ether comprising the successive steps of:

(a) etherifying the hydroxy group of 5,6,7,8-tetrahydro - 1$\beta$-hydroxy-8-methylindan-5-one with a protecting ether group;

(b) converting the etherified hydroxy compound to an alkali metal enolate thereof by reaction with an alkali metal enolating agent;

(c) reacting the enolate with an m-methoxyphenylethylating agent to form the corresponding 4-aralkylated compound;

(d) hydrolysing off the ether group protecting the 1$\beta$-hydroxy group by the action of acid to form the corresponding 1$\beta$-hydroxy-4-aralkyl compound;

(e) oxidising the 1$\beta$-hydroxy-4-aralkyl compound by the action of chromic acid to the corresponding 1-keto-4-aralkyl compound;

(f) cyclising the 1-keto-4-aralkyl compound by the action of acidic conditions; and (g) recovering the formed $\Delta^{8,14}$-bisdehydrooestrone 3-methyl ether.

15. A method according to claim 14, wherein steps (b) and (c) are effected in t-butanol and the enolate is reacted with m-methoxyphenylethyl - p - nitrobenzenesulphonate.

16. A method according to claim 14, wherein step (b) the potassium enolate is formed by reaction with an enolating agent selected from the class consisting of potassium, potassium hydride, potassium amide and potassium triphenylmethyl.

17. Alkali metal enolates of 5,6,7,8-tetrahydro-1$\beta$-tetrahydropyranlyoxy-8-methylindan-5-one.

18. The potassium enolate of 5,6,7,8-tetrahydro-1$\beta$-tetrahydropyranyloxy-8-methylindan-5-one.

19. A method of making a $\Delta^{8,14}$-bisdehydrooestrone 3-(lower)alkyl ether comprising the successive steps of:

(a) oxidising with chromic acid a compound of the formula:

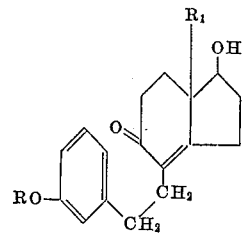

wherein R is lower alkyl and $R_1$ is lower alkyl, to form the corresponding dione;

(b) cyclising the resulting dione by reaction with phosphorus pentoxide in phosphoric acid; and (c) recovering the formed $\Delta^{8,14}$-bisdehydrooestrone 3-(lower)alkyl ether.

20. A method of making a $\Delta^{8,14}$-bisdehydrooestrone 3-(lower)alkyl ether comprising the successive steps of:

(a) oxidising with chromic acid a compound of the formula:

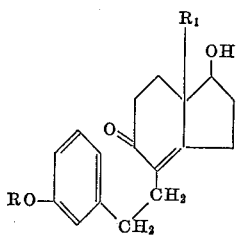

wherein R is lower alkyl and $R_1$ is lower alkyl, to form the corresponding dione;

(b) cyclising the resulting dione by reaction in alkanolic solution with hydrochloric acid in the presence of water; and (c) recovering the formed $\Delta^{8,14}$-bisdehydrooestrone 3-(lower) alkyl ether.

References Cited by the Examiner

UNITED STATES PATENTS

| | | | |
|---|---|---|---|
| 3,016,389 | 1/1962 | Johns | 260—397.4 |
| 3,032,552 | 5/1962 | Ringold et al. | 260—239.55 |
| 3,080,399 | 3/1963 | Ringold et al. | 260—397.5 |
| 3,081,316 | 3/1963 | Sakakibara et al. | 260—397.3 |

FOREIGN PATENTS 595,386  3/1961  Belgium.

OTHER REFERENCES

Crispin et al., Proc. Chem. Soc., p. 356, November 1962.

Smith et al., Experientia XIX/4, p. 177–178 (1963).

ELBERT L. ROBERTS, *Primary Examiner.*

LEWIS GOTTS, *Examiner.*

H. A. FRENCH, *Assistant Examiner.*